(No Model.) 2 Sheets—Sheet 2.
W. DEMME & A. DIERKES.
MACHINE FOR SAWING FRONT STRIPS FOR DESKS.
No. 417,709. Patented Dec. 24, 1889.
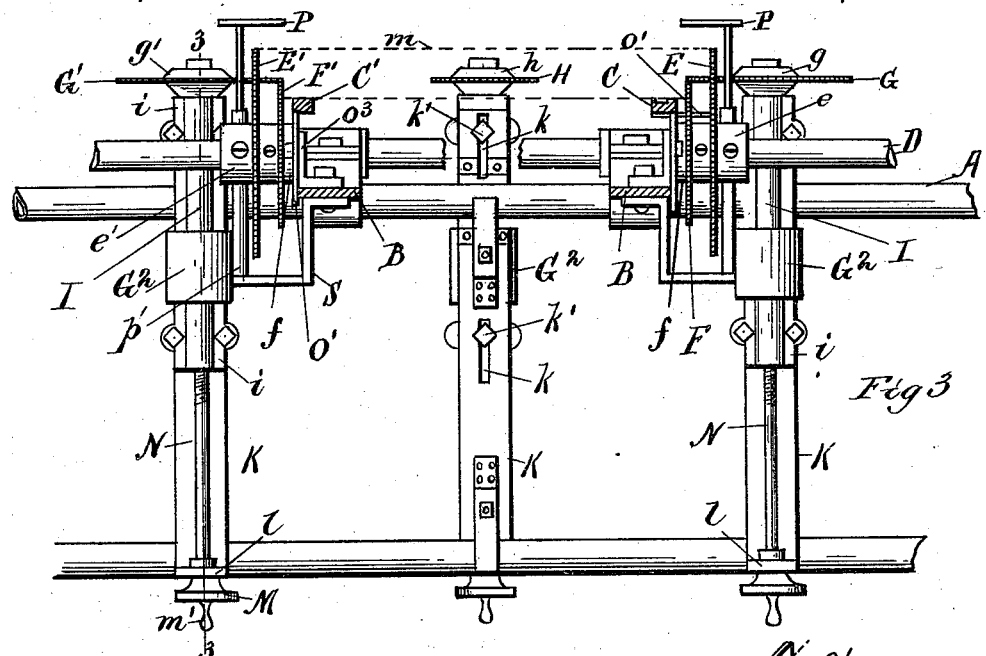
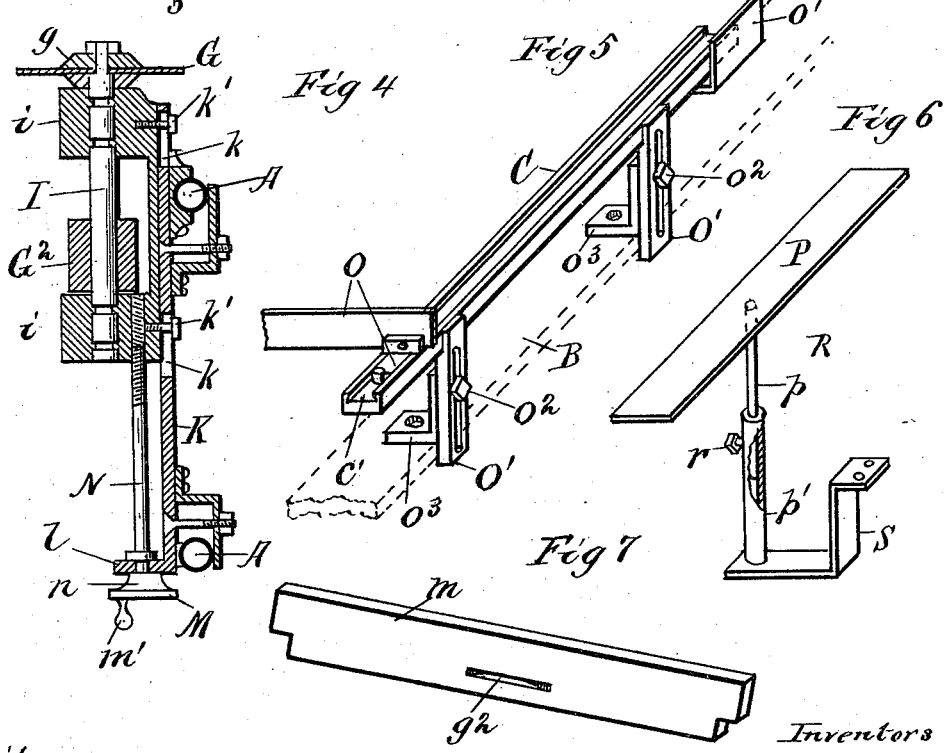
Witnesses
W. C. Coolies
A. M. Best
Inventors
William Demme
Alexander Dierkes
By Coburn & Thacher
Attys

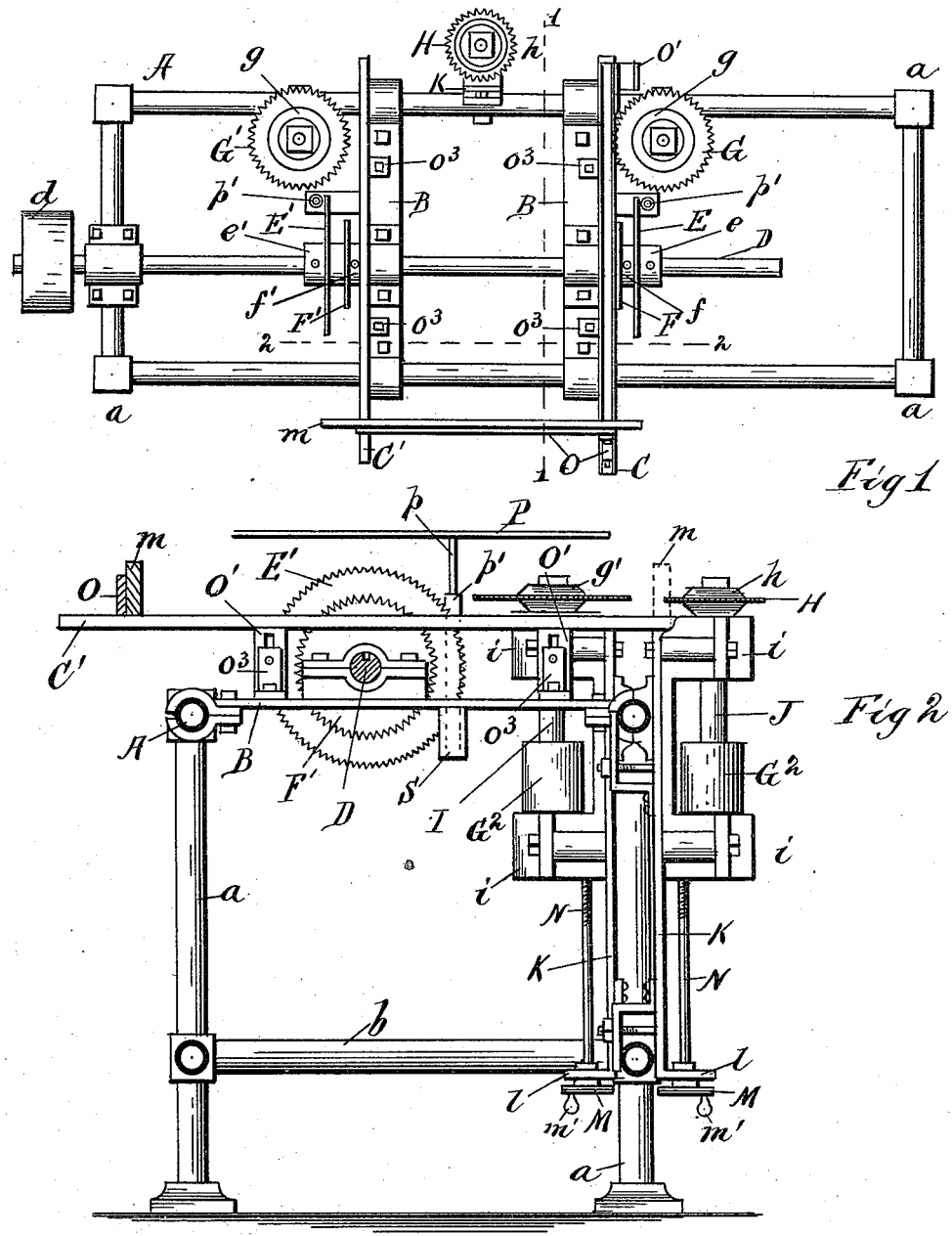

UNITED STATES PATENT OFFICE.

WILLIAM DEMME AND ALEXANDER DIERKES, OF CHICAGO, ILLINOIS.

MACHINE FOR SAWING FRONT STRIPS FOR DESKS.

SPECIFICATION forming part of Letters Patent No. 417,709, dated December 24, 1889.

Application filed August 26, 1889. Serial No. 321,947. (No model.)

*To all whom it may concern:*

Be it known that we, WILLIAM DEMME and ALEXANDER DIERKES, citizens of the United States, and residing at Chicago, in the county of Cook and State of Illinois, have invented a certain new and useful Improvement in Machines for Sawing Front Strips for Desks, &c., which is fully set forth in the following specification, reference being had to the accompanying drawings, in which—

Figure 1 is a plan view; Fig. 2, a cross-section on the line 1 1 of Fig. 1. Fig. 3 represents a longitudinal section on the line 2 2 of Fig. 1; Fig. 4, a detail section of one of the saw-arbors and its bearings on the line 3 3 of Fig. 3; Fig. 5, a perspective view of one of the sliding guides; Fig. 6, a perspective view of one of the guards over the saws, and Fig. 7 a perspective view of one of the finishing-strips after being sawed.

Like letters refer to like parts in all the figures of the drawings.

Our improvements relate to the manufacture of the front strips supporting the top and drawers in desks, tables, &c.; and it consists in an improved method whereby such strips are cut and fitted for use at one operation. Heretofore it has been usual in the manufacture of these strips to present the strip or board to be sawed several different times to the saw to be cut into proper shape for use, taking a great amount of labor and time, with the possibility of its not accurately fitting the desk.

By our improved machine the strip can be prepared at one operation and must of necessity fit accurately the place for which it is intended.

In the drawings, A represents the frame, preferably of iron, the frame shown in the drawings being manufactured of gas-pipe.

$a$ represents the legs, and $b$ the cross-piece under the top of the frame and fastened to the legs, the whole frame being fastened together by any well-known method. On the top of the frame are two flat cross-pieces B, of iron, on which rest the guides C C'.

D is a shaft or arbor having its bearing in the ends of the frame and under the guides C, on which is mounted a pulley $d$, by which it is driven. On the shaft D are mounted vertically the adjustable circular saws E E' and F F', near the guides C and C'.

$m$ is a strip of wood to be finished for use. (Shown in Fig. 3.)

The saws E E' are for the purpose of sawing off the ends of the strip completely, while the saws F F', which are smaller, are for the purpose of sawing into the strip near the end, as shown in Fig. 3, and in a direction parallel with the cut of the saws E E'. The saws E E' F F' are adjustably secured to the shaft D by means of collars $e\ e'\ f\ f'$, as shown in Fig. 1. The collars are splined for the purpose of keeping them from revolving on the shaft, and the saws are secured firmly between the collars by means of set-screws passing through the collars and clamping them to the arbors, and are adjustable on the shaft D by means of the collars and set-screws, which serve to hold them firmly in their places when in use.

G, G', and H are also adjustable saws, each one of which is mounted horizontally on an arbor at right angles to the arbor D, each one of which is operated by a separate pulley $G^2$. The line of motion of these saws is at right angles to the line of motion of the saws E E'.

The purpose of the saws G G' is to cut longitudinally into the strip and at right angles to the cut made by the saws F F', as shown in Fig. 3, said saws G G' and F F' being so adjusted as to cut a notch of the proper dimensions, so that the strip shall fit the post in the desk or table for which it is intended.

The saw H is mounted like the saws G G' and in the manner hereinafter described, and its duty is to cut a slot in the strip, as shown at $g^2$ in Fig. 7, for the purpose of receiving the bolt or lock on the drawer beneath it. These saws G, G', and H are all mounted upon arbors I J, (shown in Figs. 2 and 4,) and are secured to said arbor by collars $g\ g'\ h$, and by set-screws clamping the said collars to the arbors. The arbors I J are mounted in journal-boxes $i$, consisting of one piece of iron having an opening in the middle for the pulleys $G^2$. These journal-boxes are supported by and secured to posts K. The posts K are secured to the frame of the machine by any proper methods. In the drawings these posts are clamped and bolted to the frame, as shown in Fig. 4. The posts K are slotted, as shown at $k$ in Fig. 3, and the journal-boxes $i$ are secured to the posts K by set-screws $k'$, passing through the slot $k$ into the journal-boxes $i$. At the bottom of the posts K are steps $l$, projecting at right angles to the posts K.

M is a hand-wheel having a hub $n$ on its upper side, which hub has a bearing in the step $l$, which is circular.

N is a screw-rod rigidly secured to the hub $n$ at its center. The rod N is parallel to the post K and extends from the hub $n$ up to and into the journal-box $i$. It is screw-threaded at its top and adapted to enter a hole in the journal-box $i$, which is also screw-threaded to receive it.

Whenever it becomes necessary to adjust the saws G, G', or H on their respective arbors, the set-screws $k'$ are loosened and the hand-wheel M is revolved by the handle $m'$, turning the screw-rod N and raising or lowering the journal-boxes $i$, holding the arbors I J, and thus adjusting the saws mounted on said arbors.

The guides C C' are secured to the upper sides of the cross-pieces B, and are for the purpose of accurately guiding the strip $m$ to the saws to be operated upon. C has a dovetailed groove $c'$ in the center of the top, as shown in Fig. 5.

O is a gage fitted to slide in the groove $c'$, and is or may be used by the operator in pushing the strip to the saws. $o'$ is a stop secured to the guide C at its end to prevent any lateral motion of the strip before the sawing of the slot $g^2$ (shown in Fig. 7) is completed. These guides are adjustable vertically, as shown in Fig. 5. The standards O' are secured to the guides C C' at their upper ends, with their lower ends resting loosely against the edge of the cross-pieces B.

$o^3$ are brackets resting on and riveted to the top of the cross-pieces B. The standards O' are slotted lengthwise and are clamped to the brackets $o^3$ by set-screws $o^2$, whereby the guides C C' are adjusted.

Fig. 6 represents a guard R, which consists of a top or guard proper P, preferably of metal, mounted on a standard $p$. The standard $p$ enters into and is supported by a hollow post $p'$, in which the standard $p$ is adjustable by means of a set-screw $r$, fastened to the post $p'$. The post $p'$ is secured at its lower end to the bracket S, which is fastened to the cross-pieces B. The object of the guards is to protect the hands and other parts of the operator from injury when feeding the strip to be sawed, and it is so located that the top P extends over the saws.

The method of operation with our machine is as follows: The strip to be fitted is placed at the end of the machine, resting on one of its edges, as shown in Fig. 3, and on the guides C, and is moved by the gage O first to the vertical saws E E' and F F', where the ends are sawed off by the saws E E' and are partly sawed transversely by saws F F' for the purpose of forming a notch, as shown in Fig. 3. The strip is then moved to the horizontal saws G G', when the notch is completed by a longitudinal cut, after which the strip is moved to saw H, when the slot $g^2$ is formed and the strip completed without being taken from the machine.

Having thus described our invention, what we claim as new, and desire to secure by Letters Patent, is—

1. In a machine for sawing front strips for desks, &c., the combination of circular saws vertically mounted on an arbor, two of said saws arranged and adapted to cut off the ends of the strip completely and two of said saws adapted to cut into the strip parallel with the ends cut off for the purpose of forming one side of a notch in each end of said strip, with two circular saws horizontally mounted on arbors at right angles to the first arbor for the purpose of completing said notches in said strip, and a saw for forming a central slot in said strip to receive a bolt or lock, whereby the strip is finished in one operation, substantially as and for the purposes specified.

2. In a machine for sawing front strips for desks, &c., a circular saw for sawing off one end of the strip and a circular saw smaller in diameter and adapted to cut into the strip parallel with the end cut, so as to form one side of a notch in the end of the strip, both of said saws being mounted on the same arbor, in combination with a circular saw mounted on an arbor at right angles to the first arbor for the purpose of completing the notch in said strip, substantially as set forth.

3. In a machine for sawing front strips for desks, &c., the circular saws E E' and F F', vertically mounted on the shaft, in combination with the saws G, G', and H, horizontally mounted on the arbors I J, as and for the purposes specified.

4. In a machine for sawing front strips for desks, &c., the frame A, constructed as described, in combination with the flat cross-pieces B, the guides C C', the shaft D, having bearings in said cross-pieces, the saws E E' F F', adjustably mounted on said shaft, and the saws G, G', and H, horizontally mounted on arbors I and J, substantially as specified.

5. In a machine for sawing front strips for desks, &c., the arbors I J, mounted in the journal-boxes $i$, consisting of a single piece with space between the boxes for the pulleys $G^2$, in combination with the posts K, supporting said journal-boxes, and at their lower ends the steps $l$, the hand-wheel M, hub $n$, the screw-rod N, secured to the hub $n$, the saws G, G', and H, mounted on arbors I J, and the saws E E' F F' on the arbor D, substantially as specified.

6. In a machine for sawing front strips for desks, &c., the guards R, secured to the frame A, in combination with the saws E E' F F', mounted on the shaft D, and the saws G, G', and H, mounted on the arbors I J, substantially as specified.

<div style="text-align:right">WILLIAM DEMME.<br>ALEXANDER DIERKES.</div>

Witnesses:
   FRED GAERTE,
   HERMAN GROSSE.